US011068519B2

(12) United States Patent
Duan et al.

(10) Patent No.: US 11,068,519 B2
(45) Date of Patent: Jul. 20, 2021

(54) CONVERSATION ORIENTED MACHINE-USER INTERACTION

(71) Applicant: MICROSOFT TECHNOLOGY LICENSING, LLC, Redmond, WA (US)

(72) Inventors: Nan Duan, Beijing (CN); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 16/320,990

(22) PCT Filed: Jul. 29, 2016

(86) PCT No.: PCT/CN2016/092403
§ 371 (c)(1),
(2) Date: Jan. 25, 2019

(87) PCT Pub. No.: WO2018/018626
PCT Pub. Date: Feb. 1, 2018

(65) Prior Publication Data
US 2019/0163692 A1 May 30, 2019

(51) Int. Cl.
*G06F 16/332* (2019.01)
*G06F 16/00* (2019.01)
(Continued)

(52) U.S. Cl.
CPC .......... *G06F 16/3329* (2019.01); *G06F 16/00* (2019.01); *G06F 16/334* (2019.01); *G06F 40/279* (2020.01); *H04L 51/02* (2013.01)

(58) Field of Classification Search
CPC .... G06F 16/3329; G06F 16/334; G06F 16/00; G06F 40/279; H04L 51/02
(Continued)

(56) References Cited

U.S. PATENT DOCUMENTS 7,814,048 B2  10/2010  Zhou et al.
7,904,297 B2   3/2011  Mirkovic et al.
(Continued)

FOREIGN PATENT DOCUMENTS

| CN | 101377777 A | 3/2009 |
| CN | 103177108 A | 6/2013 |
| CN | 103226580 A | 7/2013 |

OTHER PUBLICATIONS

"Office Action Issued in European Patent Application No. 16910206.8", dated Aug. 21, 2020, 8 Pages.
(Continued)

*Primary Examiner* — Dung K Chau

(57) ABSTRACT

In implementations of the subject matter described herein, a new approach for presenting a response to a message in a conversation is proposed. Generally speaking, in response to receiving a message in a conversation, the received message will be matched with one or more documents on the sentence basis. That is, the received message is compared with the sentences from a document(s), rather than predefined query-response pairs. In this way, a whole sentence may be selected from the document as a candidate response. Then the suitability of this sentence with respect to the ongoing conversation will be determined, and the response will be generated and rendered in an adaptive way based on the suitability. As a result, the user experiences may be significantly enhanced in the chatbot scenario.

20 Claims, 5 Drawing Sheets

(51) Int. Cl.
G06F 40/279 (2020.01)
G06F 16/33 (2019.01)
H04L 12/58 (2006.01)

(58) Field of Classification Search
USPC .................................................. 707/728
See application file for complete search history.

(56) References Cited

U.S. PATENT DOCUMENTS

| | | | |
|---|---|---|---|
| 8,015,143 | B2 | 9/2011 | Estes |
| 8,630,961 | B2 | 1/2014 | Beilby et al. |
| 9,110,944 | B2 | 8/2015 | Brown et al. |
| 9,177,318 | B2 | 11/2015 | Shen et al. |
| 9,213,940 | B2 | 12/2015 | Beilby et al. |
| 2005/0005266 | A1* | 1/2005 | Datig ................... G06N 5/02 717/136 |
| 2006/0122834 | A1* | 6/2006 | Bennett ................. G10L 15/30 704/256 |
| 2006/0282414 | A1 | 12/2006 | Sugihara et al. |
| 2008/0046394 | A1 | 2/2008 | Zhou et al. |
| 2008/0281922 | A1* | 11/2008 | Renshaw .............. G06F 16/345 709/206 |
| 2009/0204605 | A1 | 8/2009 | Bai et al. |
| 2010/0125456 | A1 | 5/2010 | Weng et al. |
| 2010/0250597 | A1* | 9/2010 | Yang ...................... G06N 5/02 707/776 |
| 2012/0052930 | A1* | 3/2012 | McGucken ............. A63F 13/69 463/1 |
| 2014/0108006 | A1* | 4/2014 | Vogel ..................... G06F 40/40 704/9 |
| 2014/0358890 | A1 | 12/2014 | Chen et al. |
| 2015/0178371 | A1* | 6/2015 | Seth .................... G06F 16/3329 707/748 |

OTHER PUBLICATIONS

International Search Report and Written Opinion for PCT/CN2016/092403, dated Mar. 29, 2017.

"Extended European Search Report Issued in European Patent Application No. 16910206.8", dated Jan. 27, 2020, 9 Pages.

Cooper, et al., "Probabilistic Retrieval Based on Staged Logistic Regression", In Proceedings of the 15th Annual International ACM SIGIR Conference on Research and Development in Information Retrieval, Jun. 21, 1992, pp. 198-210.

Fader, et al., "Paraphrase-Driven Learning for Open Question Answering", In Proceedings of the 51st Annual Meeting of the Association for Computational Linguistics, vol. 1, Aug. 2013, pp. 1608-1618.

Feng, et al., "Applying Deep Learning to Answer Selection: A Study and an Open Task", In Proceedings of the IEEE Workshop on Automatic Speech Recognition and Understanding (ASRU), Dec. 13, 2015, pp. 813-820.

Gruenstein, Alexander, "Response-Based Confidence Annotation for Spoken Dialogue Systems", In Proceedings of the 9th SIGdial Workshop on Discourse and Dialogue, Jun. 19, 2008, pp. 11-20.

Jafarpour, et al., "Filter, Rank, and Transfer the Knowledge: Learning to Chat", In Microsoft Research Technical Report MSR-TR-2010-93, Jul. 12, 2010, 18 Pages.

Ji, et al., "An Information Retrieval Approach to Short Text Conversation", In Repository of arxiv.1408.6988, Aug. 29, 2014, 21 Pages.

Koehn, et al., "Statistical Phrase-Based Translation", In Proceedings of the Conference of the North American Chapter of the Association for Computational Linguistics on Human Language Technology—vol. 1, May 27, 2003, 8 Pages.

Litman, et al., "Njfun: A Reinforcement Learning Spoken Dialogue System", In Proceedings of the ANLP/NAACL Workshop on Conversational systems—vol. 3, May 4, 2000, pp. 17-20.

Marom, et al., "A Predictive Approach to Help-desk Response Generation", In Proceedings of the 20th International Joint Conference on Artificial Intelligence, Jan. 6, 2007, 6 Pages.

Miao, et al., "Neural Variational Inference for Text Processing", In Proceedings of the 33rd International Conference on Machine Learning, Jun. 19, 2016, 10 Pages.

Mikolov, et al., "Distributed Representations of Words and Phrases and their Compositionality", In Proceedings of the 27th International Conference on Neural Information Processing Systems—vol. 2, Dec. 5, 2013, 9 Pages.

Ritter, et al., "Data-Driven Response Generation in Social Media", In Proceedings of the Conference on Empirical Methods in Natural Language Processing, Jul. 27, 2011, pp. 583-593.

Schatzmann, et al., "A Survey of Statistical User Simulation Techniques for Reinforcement—Learning of Dialogue Management Strategies", In Journal of the Knowledge Engineering Review vol. 21, Issue No. 2, Jun. 2006, 33 Pages.

Severyn, et al., "Learning to Rank Short Text Pairs with Convolutional Deep Neural Networks", In Proceedings of th 38th International ACM SIGIR Conference on Research and Development in Information Retrieval, Aug. 9, 2015, 10 Pages.

Shang, et al., "Neural Responding Machine for Short-Text Conversation", In Proceedings of the 53rd Annual Meeting of the Association for Computational Linguistics and the 7th International Joint Conference on Natural Language Processing of the Asian Federation of Natural Language Processing, Jul. 26, 2015, 12 Pages.

Wang, et al., "What Is the Jeopardy Model? A Quasi-synchronous Grammar for Qa", In Proceedings of the Conference on Empirical Methods in Natural Language Processing (EMNLP), vol. 7, Jun. 28, 2007, pp. 22-32.

Williams, et al., "Partially Observable Markov Decision Processes for Spoken Dialog Systems", In Journal of Computer Speech and Language, vol. 21, Issue 2, Apr. 2007, pp. 393-422.

Wu, et al., "Topic Augmented Neural Network for Short Text Conversation", In Journal of the Computing Research Repository, May 2016, 10 Pages.

Yih, et al., "Question Answering Using Enhanced Lexical Semantic Models", In Proceedings of the 51st Annual Meeting of the Association for Computational Linguistics, vol. 1, Aug. 4, 2013, pp. 1744-1753.

Yin, et al., "Abcnn: Attention-Based Convolutional Neural Network for Modeling Sentence Pairs", In Repository of : arXiv:1512.05193, Dec. 2015, 15 Pages.

Yu, et al., "Deep Learning for Answer Sentence Selection", In Repository of: arXiv:1412.1632, Dec. 4, 2014, 9 Pages.

Yuan, et al., "LightLDA: Big Topic Models on Modest Compute Clusters", In Proceedings of the 24th International Conference on World Wide Web, May 18, 2015, 19 Pages.

* cited by examiner

CONVERSATION ORIENTED MACHINE-USER INTERACTION

CROSS-REFERENCE TO RELATED APPLICATION

This application is a U.S. National Stage Application of PCT/CN2016/092403, filed Jul. 29, 2016, which application is hereby incorporated by reference. To the extent appropriate, a claim of priority is made to the above disclosed application.

BACKGROUND

Chatbots have been becoming increasingly popular in recent years. A chatbot is an artificial intelligence computer software program that is developed to simulate intelligent conversation with human users via text or voice. Chatbots are often integrated into dialog system as automated online assistants for various practical purposes, including smart chatting, customer service or information acquisition and so on.

Traditionally, chatbot systems are designed to reply a message based on the existing query-response (Q-R) pairs. That is, the user inputs a query, and the chatbot system returns a response or an answer to the query. To this end, a chatbot system may store a set of existing Q-R pairs in advance, each of which has a query and a corresponding response. When the chatbot system receives a message from a user, the chatbot system matches the message with all the queries in the set of existing Q-R pairs and selects a Q-R pair whose query matches the message best. Then, the chatbot system uses the response in the selected Q-R pair as a response to the message.

SUMMARY

In accordance with implementations of the subject matter described herein, a new approach for presenting a response to a message in a conversation is proposed. Generally speaking, in response to receiving a message in a conversation, the message will be matched with one or more documents on the sentence basis. That is, the received message is compared with the sentences from a document(s), rather than predefined query-response pairs. In this way, a complete sentence may be selected from the document as a candidate response. Then the suitability of this sentence with respect to the ongoing conversation will be determined, and the response will be generated and rendered in an adaptive way based on the suitability. As a result, the user experiences may be significantly enhanced in the chatbot scenario.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The details of one or more implementations of the subject matter described herein are set forth in the accompanying drawings and the description below. Other features, aspects, and advantages of the disclosure will become apparent from the description, the drawings, and the claims, wherein:

Throughout the figures, same or similar reference numbers will always indicate same or similar elements.

DETAILED DESCRIPTION

Figure 1:
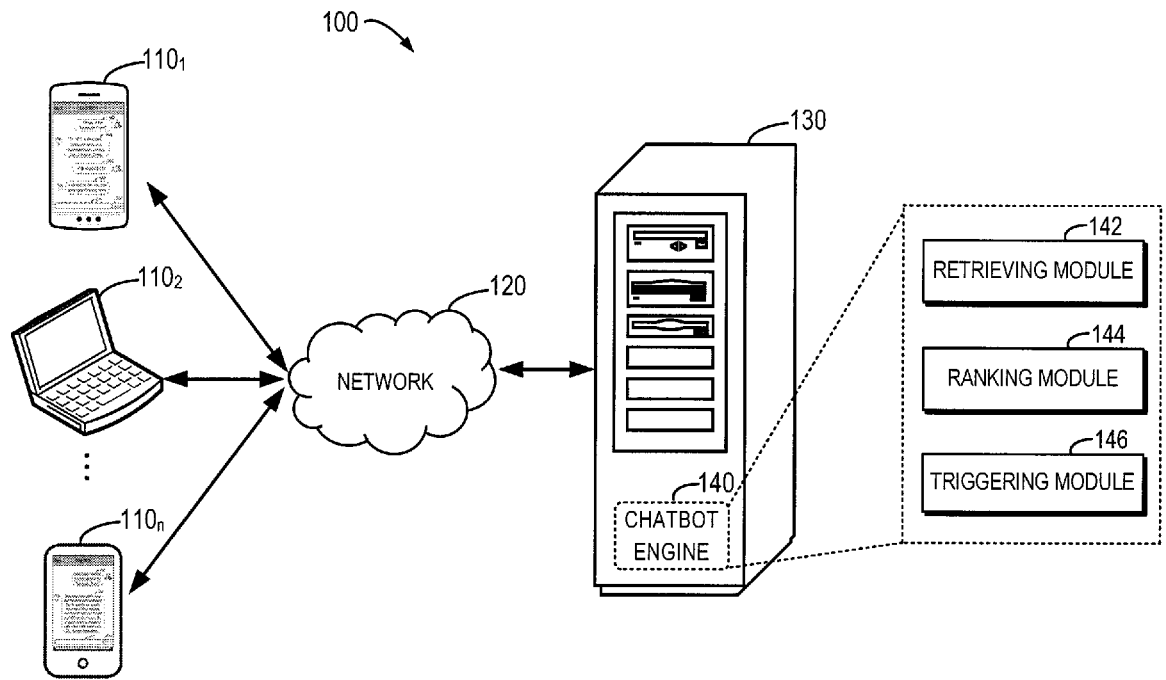
FIG. 1 is a schematic diagram illustrating an environment 100 in which example implementations of the subject matter described herein can be implemented.

Principle of the subject matter described herein will now be described with reference to some example implementations. It is to be understood that these implementations are described only for the purpose of illustration and help those skilled in the art to understand and implement the subject matter described herein, without suggesting any limitations as to the scope of the disclosure. The disclosure described herein can be implemented in various manners other than the ones describe below.

As used herein, the term "include" and its variants are to be read as open terms that mean "include, but is not limited to". The term "based on" is to be read as "based at least in part on". The term "a" is to be read as "one or more" unless otherwise specified.

The term "one implementation" and "an implementation" are to be read as "at least one implementation". The term "another implementation" is to be read as "at least one other implementation". Moreover, it is to be understood that in the context of the subject matter described herein, the terms "first", "second" and the like are used to indicate individual elements or components, without suggesting any limitation as to the order of these elements. Further, a first element may or may not be the same as a second element. Other definitions, explicit and implicit, may be included below.

Conventionally, the accuracy and intelligence of the chatbot system depends largely on the amount of the existing Q-R pairs stored in the chatbot system. As the explosive growth of social media, the amount of Q-R pairs has experienced massive growth in recent years. However, collecting such Q-R pairs is intractable in many domains, and a limited number of Q-R pairs cannot respond well to all kinds of messages after all. Besides, traditional chatbot systems generally do not use existing resources except for Q-R pairs, and traditional chatbot system always presents one kind of response without considering the suitability for the conversation. Thus, the traditional chatbot systems generally cannot present a suitable response to the received message during a conversation.

According to implementations of the subject matter described herein, for a message received in a chatting conversation, a sentence(s) to the message is determined from one or more documents based on the sentence matching. That is, the sentence(s), which is a candidate response to the received message, is generated based on relevance between the message and the sentences from one or more documents. Then if the sentence is determined to be suitable for the current conversation, then the response can be directly presented to the user. Otherwise, the sentence will be discarded and another response is generated to adapt the ongoing conversation.

By using sentences from a document rather than Q-R pairs, the adaptability of the chatbot system on different chatting topics is significantly improved. Moreover, the sentences coming from a document(s) make the responses meaningful and satisfying. Thus, a more suitable response can be presented in the conversation. Some example implementations will now be described.

Reference is first made to FIG. 1 which shows a block diagram illustrating an environment 100 in which example implementations of the subject matter described herein can be implemented. As shown, the environment 100 includes devices $110_1$, $110_2$, . . . , $110_n$ (collectively referred to as "device 110") and a server 130. It is to be understood that although three devices 110 are shown, the environment 100 may include any suitable number of devices. Likewise, the environment 100 may include two or more servers 130.

A device 110 may be any suitable fixed, mobile, or wearable device. Examples of the devices 110 include, but are not limited to, cellular phones, smartphones, tablet computers, personal digital assistants (PDAs), digital watches, digital glasses, laptop computers, desktop computers, tablet computers, or the like. The devices 100 have chatting applications installed and executed thereon, such as instant messaging applications, chatting tools, or the like, through which the devices 100 may communicate with the server 130 or communicate with each other.

As shown in FIG. 1, the devices 110 and the server 130 are communicatively connected to one other via a network 120. Examples of the network 120 includes, but is not limited to, a wired or wireless network, such as a local area network ("LAN"), a metropolitan area network ("MAN") a wide area network ("WAN") or the Internet, a communication network, a near field communication connection or any combination thereof.

The server 130 is a device capable of processing the received message and providing the processed information. For example, the server 130 may host a chatbot engine 140 which is capable of automatically chatting with users of the devices 110. That is, a user may have a "conversation" with the chatbot engine 140 by use of the chatting application executed on his/her device 110. In such conversation, the chatbot engine 140 receives a message from the device 110 and presents a response to the message to the device 110. As used herein, a "message" refers to any type of information communicated to or from a computer system, such as a message sent from the device 110 to the chatbot engine 140 in the server 130, and the message includes, but is not limited to, a textual message, an audio message, a video message, or the like.

The chatbot engine 140 includes a retrieving module 142, a ranking module 144 and a triggering module 146. These modules may be implemented in hardware, software or a combination thereof. For instance, in some implementations, these modules can be implemented as software modules in a computer program, which can be loaded in a memory for execution by a processing unit(s). Example implementation of the chatbot engine 140 will be discussed in the following paragraphs.

In operation, upon receipt of a message from the user, the device 110 (more particularly, the chatting application) sends the message to the server 130. The retrieving module 142 determines sentences for the received message from one or more documents that are stored in the server 130 or that may be obtained from other sources in run time. The ranking module 144 ranks all the sentences and selects a relevant sentence therefrom as a candidate response. The triggering module 146 may decide whether it is suitable to use the relevant sentence as a response to message. For example, the chatbot engine 140 may determine whether the relevant sentence is confident enough to respond to the message.

For the sake of discussions, example implementations of the subject matter described herein will be described with reference to the environment 100. However, it is to be understood that such an environment is described merely for the purpose of illustration, without suggesting any limitations as to the scope of the subject matter described herein. For example, the ideas and principles are applicable to a stand-alone machine as well. That is, the chatbot engine 140 may be installed and executed at least partially on a device(s) 110. In this case, the server 130 and network 120 can be omitted. In such implementations, the conversation can be implemented locally at the device 110.

Figure 2:
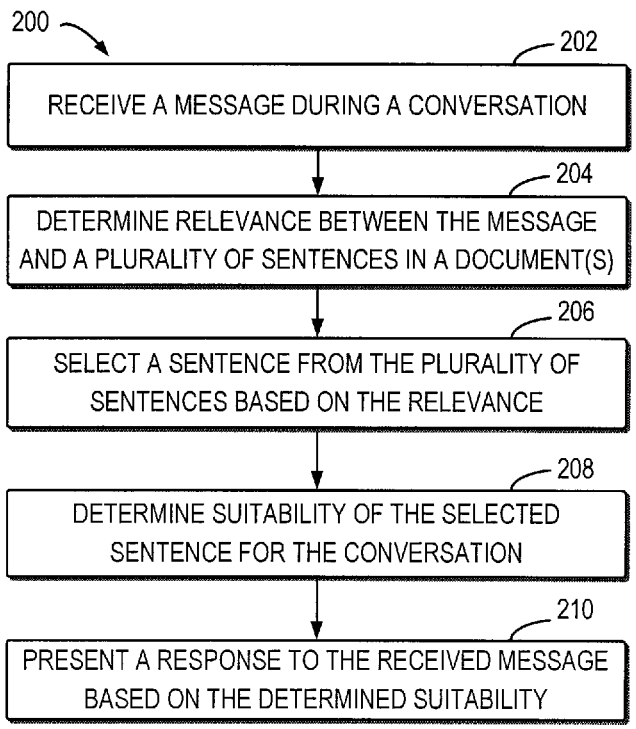
FIG. 2 is a flowchart illustrating a method for presenting a response to a message in a conversation in accordance with an example implementation of the subject matter described herein.

The functionality/operations of the chatbot engine 140 will be described with reference to FIG. 2, which is a flowchart illustrating a method 200 for presenting a response to a message in a conversation in accordance with an example implementation of the subject matter described herein.

At 202, a message is received during a conversation. The message may be received via the user interface(s) of the chatting application on the device 110 and transmitted to the server 130 via the network 120. The received message may be a textual message or an audio message input by a user of the device 110. The received message may be a word, a phrase, a sentence or even multiple sentences, and the received message may be a question or a non-question such as a statement.

At 204, relevance between the received message and a plurality of sentences in one or more documents is determined. Any suitable documents can be used in connection with implementations of the subject matter described herein, such as unstructured documents, semi-structured documents or a combination thereof. In some implementations, some or all of the documents as used by the chatbot engine 140 can be updated periodically and/or on demand.

For any document, the sentences contained therein are obtained and stored. To this end, the document can be parsed and divided into sentences, for example, by detecting one or more predetermined punctuations. Examples of such punctuations include, but are not limited to, ".", "?" and "!" and so forth. The obtained plurality of sentences may be then indexed and stored. This is only an example implementation. Any suitable technology, either currently known or to be developed in future, can be applied to parse the documents to obtain sentences. In another implementation, two predefined tags may be added to the beginning and end of each passage to index a sentence in the document.

According to implementations of the subject matter described herein, the message is directly matched with the document(s) in the unit of sentences, instead of the predefined queries in Q-R pairs as in traditional chatbot systems. Particularly, at 206, a sentence(s) is selected from the plurality of sentences based on the relevance determined at 204. For example, one or more sentences having higher relevance than other sentences may be selected as the response to the message. In some implementations, a sentence that is most relevant with the received message is selected from the document(s).

At 208, the suitability of the selected sentence for the conversation is determined. The term "suitability" refers to a degree to which a sentence is suitable to be presented in a conversation as a response to a user's input. That is, the suitability of a sentence is the "fitness" of the sentence with respect to the ongoing conversation. Example implementations of determination of the suitability will be discussed in the following paragraphs.

At 210, a response to the received message is presented based on the determined suitability. In general, if the sentence selected at 206 is determined to be suitable for the conversation, then the selected sentence can be directly output as a response to the message received at 210. For example, it is assumed that the received message is "who is the greatest basketball player?" If the sentence obtained at 206 is "Michael Jordan is considered by many people as the greatest player of all time," then this sentence will be determined as a suitable response and thus displayed to the user.

On the other hand, if the selected sentence is unsuitable for the conversation, the sentence will not be directly presented as a response to the message in the conversation.

In this case, a "chitchat" response may be generated and presented to the user, for example. For instance, if the message is "Nice to meet you" which is determined as a chitchat message, then any sentence obtained at 206 which is literally matched to this message would probably not a suitable message. As a result, the chatbot engine 140 may simply display a chitchat response such as "Nice to meet you too." Example implementations in this regard will be discussed later.

Figure 3:
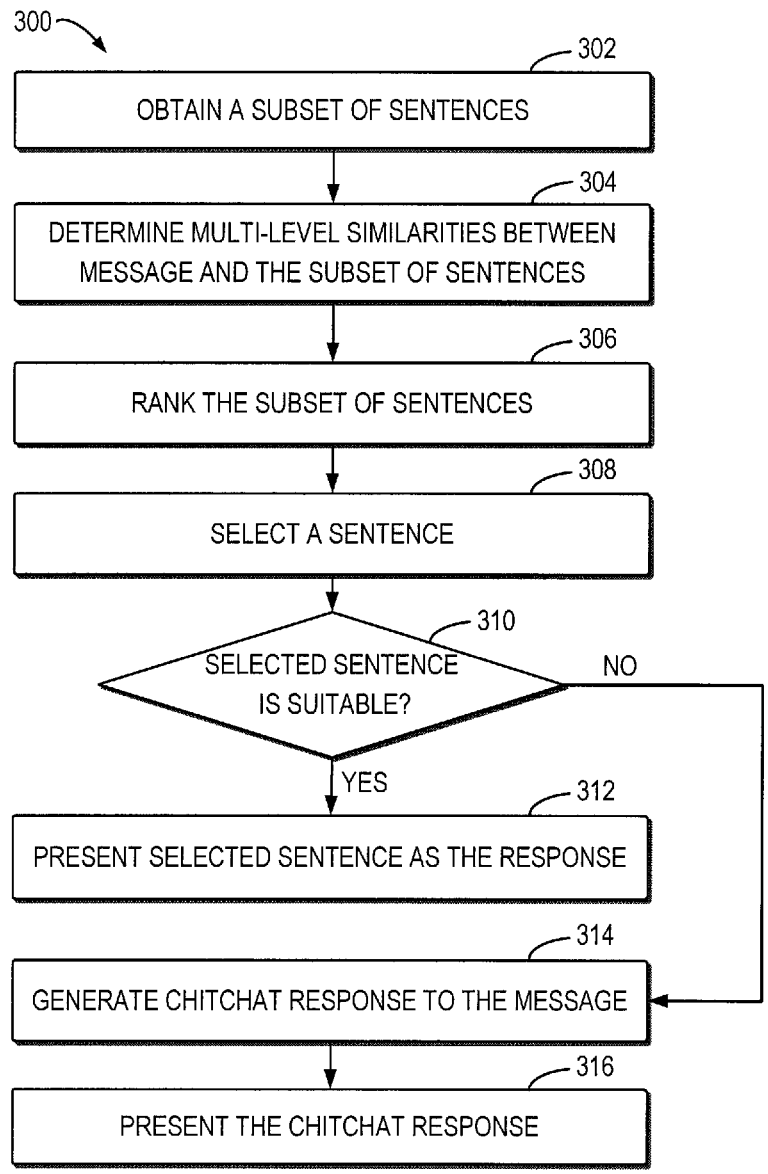
FIG. 3 is a flowchart illustrating another method for presenting a response to a message in a conversation in accordance with an example implementation of the subject matter described herein.

FIG. 3 is a flowchart illustrating another method 300 for presenting a response to a message in a conversation in accordance with an example implementation of the subject matter described herein. It is to be understood that the method 300, which may be performed by the chatbot engine 140 as shown in FIG. 1, can be considered as an example implementation of the method 200.

In the method 300, the relevance between the received message and the sentences in one or more documents is determined at 302 and 304, which is corresponding to action 204 in the method 200. At 302, a subset of sentences in a document(s) is obtained. That is, in such implementations, the retrieving module 142 first filters out some sentences, so as to improve efficiency of the subsequent processing. Of course, it is to be understood that in some other implementations, all the sentences in the document can be processed without any pre-filtering.

Generally speaking, some sentences may be filtered out according to their word-level matching degree with the received message. A sentence with low matching degree may be filtered out from the subsequent processing. To this end, in some implementations, a bag-of-words model may be applied. As known, the bag-of-words model is a simplifying representation used in natural language processing and information retrieval. In this model, a text (such as a sentence) is represented as the bag (multiset) of its words, with the grammar and even word order being discarded. The retrieving module 142 may match the message and sentences in the document on the basis of bag-of-words. Alternatively, or in addition, it is also possible to use N-gram model to store the spatial information of the sentences. Any suitable text processing technologies can be used herein to obtain a subset of sentences from the sentences contained in the document(s).

At 304, similarities between the received message and the subset of sentences are determined at a plurality of levels, which are used as metrics of the relevance between the received message and the subset of sentences. For ease of discussions, such similarities are referred to as "multi-level similarities" in the context of this disclosure. These similarities may be combined, for example, as a weighted sum of a plurality of individual similarities. In some implementations, for example, the multi-level similarities determined at 304 may include at least two of the following: a word-level similarity, a phrase-level similarity, a sentence-level similarity, a document-level similarity and a semantic-level similarity. The individual similarities will now be discussed.

The word-level similarity represents a similarity between a message and a sentence at the word level. In some implementations, the word-level similarity may include at least one of a word matching similarity $h_{WM}$, a word-to-word machine translation similarity $h_{W2W}$ and a word vector similarity $h_{W2V}$.

In some implementations, for a message Q and a sentence S, the word matching similarity $h_{WM}$ may be determined based on a ratio of the number of non-stop words occurring in both Q and S and the number of non-stop words in Q. Generally, a stop word is a word which does not contain important significance, and the stop word is generally filtered out before or after natural language processing. The stop words include, but are not limited to "a", "do", "is", "to", "which", or the like. Alternatively, or in addition, each non-stop word in Q may have a correspond weight depending on the importance thereof, and the word matching similarity $h_{WM}$ may be determined based on the respective weight of each non-stop word in Q.

In some implementations, the word-to-word machine translation similarity $h_{W2W}$ may be determined by considering synonyms and associated words on the basis of the word matching similarity $h_{WM}$. For example, the word "clever" in Q and the word "smart" S will be regarded as a co-occurred word in determining the $h_{W2W}$, while they are not regarded as a co-occurred word in determining the $h_{WM}$.

In some implementations, the word vector similarity $h_{W2V}$ may be determined based on the average similarity between each non-stop words pair $(S_j, Q_i)$, where $S_j$ denotes the j-th word in the sentence S, and $Q_i$ denotes the i-th word in the message Q, and the average similarity between words may be determined by means of transition probability in the predefined database.

The phrase-level similarity represents a similarity between a message and a sentence at the phrase level. The phrase-level similarity may include at least one of a paraphrase-based similarity $h_{PP}$ (S,Q) or a phrase translation-based similarity $h_{PT}(S,Q)$.

In an implementation, the paraphrase-based similarity $h_{PP}$ (S,Q) between the message Q and the sentence S may be determined as below:

$$h_{PP}(S, Q) = \frac{\sum_{n=1}^{N} \sum_{j=0}^{|S|-n} \text{Count}_{PP}(S_j^{j+n-1}, Q)}{N \cdot (|S| - n + 1)} \quad (1)$$

where $S_j^{j+n-1}$ denotes the consecutive word sequence in S, which starts from $S_j$ and ends with $S_{j+n-1}$; $\text{Count}_{PP}(S_j^{j+n-1}, Q)$ denotes a degree of relevance between $S_j^{j+n-1}$ and Q; N denotes the maximum n-gram order (for example, 3); |S| denotes the length of the sentence S. Besides, if $S_j^{j+n-1} \in Q$, then $\text{Count}_{PP}(S_j^{1+n-1}, Q)=1$; else if $<s_j^{j+n-1}, s, \text{scores}(s; S_j^{j+n-1})> \in PP$ and the paraphrase s of $S_j^{j+n-1}$ occurs in Q, then $\text{Count}_{PP}(S_j^{j+n-1}, Q)=\text{score}(s; S_j^{j+n-1})$; else, $\text{Count}_{PP}(S_j^{j+n-1}, Q)=0$, and wherein $\text{score}(s_i; s)$ denotes a confidence sore that a phrase $s_i$ can be paraphrased to a phrase $s_j$, and PP denotes a predefined paraphrase table.

Alternatively, or in addition, in an implementation, the phrase translation-based similarity $h_{PT}(S,Q)$ between the message Q and the sentence S may be determined as below:

$$h_{PT}(S,Q) = \frac{\sum_{n=1}^{N} \sum_{j=0}^{|S|-n} \text{Count}_{PT}(S_j^{j+n-1}, Q)}{N \cdot (|S|-n+1)} \quad (2)$$

where $\text{Count}_{PT}(S_j^{j+n-1}, Q)$ denotes a degree of relevance between $S_j^{j+n-1}$ and Q; and if $S_j^{j+n-1} \in Q$, then $\text{Count}_{PT}(S_j^{j+n-1}, Q)=1$, els if $<S_j^{j+n-1}, s, p(S_j^{j+n-1}/s), p(s|S_j^{j+n-1})> \in PT$ and the translation s of $S_j^{j+n-1}$ is contained in Q, then $\text{Count}_{PT}(S_j^{j+1}, Q)=p(S_j^{j+n-1}|s) \cdot p(s|S_j^{j+n-1})$; else, $\text{Count}_{PT}(S_j^{j+n-1}, Q)=0$, and wherein PT denotes a predefined phrase table.

The sentence-level similarity represents a similarity between a message and a sentence at the sentence level. The sentence-level similarity may be determined by a sentence embedding model learnt from question-answer pairs or sentence-next sentence pairs. The sentence embedding model is used to determine a sentence-level similarity between two sentences by calculating a cosine value between two vectors for the two sentences, and the vectors for the two sentences can be derived by any suitable technology, for example, Convolutional Neural Network (CNN).

Generally, the discourse relation between two adjacent sentences in a given document may include conditional relation, causality relation, progressive relation, coordinate relation and so on. In an implementation, a relationship between two adjacent sentences (for example, a sentence and its previous sentence) in a document may be determined. If two adjacent sentences are determined to be a causality relationship, the two adjacent sentences may be regarded as a query and its corresponding response. The sentence-level similarity between the message and a sentence may be determined based on a matching degree between the message and the previous and/or the next sentence of the sentence. Thus, the accuracy of the similarity determination may be enhanced by identifying the causality relationship between two adjacent sentences.

The document-level similarity represents a similarity between a message and a sentence at the document level. Generally, if a sentence in a document can respond to a received message, then its context should also be relevant to the received message. Thus, in some implementations, the sentence is represented by a group of sentences, which may include a sentence, a previous sentence prior to the sentence and a next sentence subsequent to the sentence. Then, the document-level similarity between the message and the sentence may be determined based on the sentence similarities between the message and the sentence, the previous sentence, and the next sentence.

For example, for a given sentence, its document-level similarity with respect to the message may be determined based on: (i) the sentence similarity between this given sentence and the message, (ii) the sentence similarity between at least one prior sentence and the message, and (iii) the sentence similarity between at least one subsequent sentence and the message. For example, in some implementations, the document-level similarity may be determined as a combination (for example, a weighted sum) of these sentence similarities. In this way, the accuracy of the similarity determination may be enhanced by considering the document-level similarity between the message and the sentence.

The semantic-level similarity represents a similarity between a message and a sentence at the semantic level. In some implementations, the semantic-level similarity may include an indication whether the message Q and the sentence S represent a same type, a same relation and/or a same topic, wherein the type and relation may be predefined, and the topic may be predefined or non-defined. Any known or future developed relation, type, or topic determination method can be used to determine the probability that a message or a sentence belongs to a specific relation, a specific type or a specific topic. In an implementation, if the message Q and the sentence S represent a same type, a same relation or a same topic, then the semantic-level similarity may be determined as 1; otherwise, it would be determined as 0.

Thus, by determining multi-level similarities between the message and the sentences in the subset of sentences at 304, a more accurate sentence can be selected from the subset of sentences.

Still in reference to FIG. 3, at 306-308, a sentence is selected based on the determined relevance (corresponding to action 206 in the method 200). Particularly, at 306, the sentences in the subset are ranked in the order of the determined multi-level similarities. In one implementation, for a message Q and a sentence S, the ranking may be determined as below:

$$\text{Rank}(S,Q) = \sum_{k=1}^{N} \lambda_k \cdot h_k(S,Q) \quad (3)$$

where $h_k(\ )$ denotes a similarity of k-th level, $\lambda_k$ denotes a weight of the $h_k(\ )$, N denotes the number of similarity functions.

Alternatively, or in addition, in some implementations, a machine learning ranking model may be trained to rank a plurality of sentences. The machine learning ranking model can be trained with the question-answer pairs crawled from community websites. For example, for each question-answer pair in the training data, there are a plurality of answers to one question, and the best answer has been known and labeled. Thus, these labeled question-answer pairs are used to train the machine learning ranking model. By applying the trained machine learning ranking model to the ranking model 144, the sentences can be automatically ranked in the chatbot scenario.

At 308, a sentence is selected from the subset of sentence based on the ranking. For example, the highest ranked sentence can be selected as most relevant sentence. Next, a response to the message is generated and presented at 310 to 316 which are corresponding to actions 208-210.

At 310, it is determined whether the selected sentence is suitable for the conversation, which is corresponding to action 208 in the method 200. Determination of the suitability will be discussed below with reference to FIG. 4.

If the selected sentence is determined at 310 to be suitable for the conversation, at 312, the selected sentence is presented as a response to the message in the conversation. That is, the response to the message may be a sentence which is directly selected from a document if the sentence is suitable for the conversation. In this way, the response can provide a larger amount of information and more content, and thus the response is more satisfying and meaningful.

On the other hand, if the selected sentence is determined at 310 to be unsuitable for the conversation, the selected sentence will not be presented as the response to the message. In this case, at 314, a chitchat response may be determined by matching the received message and one or more predetermined Q-R pairs. For example, the received message is matched with all the queries in the existing Q-R pairs and a response in a Q-R pair whose query matches the received message best is selected as the chitchat response.

At 316, the generated chitchat response is presented in the conversation. Thus, different kinds of responses are presented according to different suitability results, and a corresponding type of response (for example, a document-based response or a chitchat response) is generated and presented in the conversation, thereby improving the user experience of using the chatbot.

Figure 4:
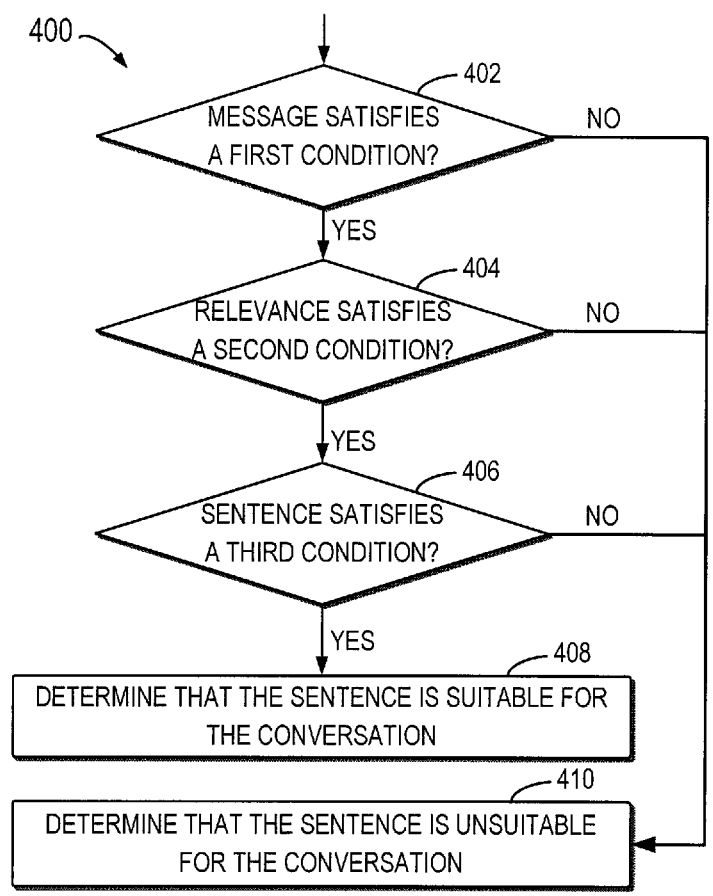
FIG. 4 is flowchart illustrating a method for determining suitability of a sentence for a conversation in accordance with an example implementation of the subject matter described herein.

FIG. 4 is flowchart illustrating a method 400 for determining (208, 310) the suitability of a sentence for a conversation in accordance with an example implementation of the subject matter described herein.

At 402, it is determined whether the received message satisfies a first condition. In an implementation, the first condition may be that the received message is not a chitchat message. That is, in such implementations, the messages are divided into chitchat messages and non-chitchat messages. As such, if a message is a chitchat message, a chitchat response may be more suitable, and a sentence from a document would not be presented as a response to the received message. For example, the chitchat messages may be collected based on the conversations or dialogs from social networking sites.

In another implementation, the first condition may be that not all words included in the message are stop words. If all words included in the message are stop words (for example, a message "they will do that" in which all words are stop words), it means that the message is not a non-chitchat message. In this case, there is no need to present a document-based response. As shown, if the message does not satisfy the first condition, the method 400 proceeds to 410, where the selected sentence is determined to be unsuitable for the conversation.

In some implementations, action 402 may be determined immediately after receiving a message in a conversation. That is, action 402 may be performed before action 204 in the method 200. In this case, if the message does not satisfy the first condition, the chitchat response is generated directly without generating a document-based response.

If the received message satisfies the first condition, at 404, it is determined whether the relevance between the received message and the sentence satisfies a second condition. For example, if a degree of the relevance exceeds a threshold degree, the relevance satisfies the second condition. Alternatively, it is possible to define a score s(S,Q) as below:

$$s(S, Q) = \frac{1}{1 + e^{-\alpha \cdot Rank(S,Q)}} \quad (4)$$

where α denotes the scaling factor that control the distribution of s( ) smooth or sharp. If the score exceeds a predetermined threshold τ, the relevance is determined to satisfy the second condition. Both α and τ are determined by experiments or specified by users, for example.

If the relevance between the received message and the sentence does not satisfy the second condition, the method 400 proceeds to 410, where the selected sentence is determined to be unsuitable for the conversation. If the relevance satisfies the second condition, at 406, it is determined whether the sentence satisfies a third condition.

In one implementation, the third condition may be that a length of the sentence is less than a predetermined threshold. That is, if the length of the sentence is too long, it may be unfit for presenting in a conversation which has a limited size of window. In another implementation, the third condition may be that the sentence does not start with one or more predetermined words that express progressive relation, such as "but also", "besides", "moreover" and so on. Since the content of sentences starting with these words usually depends on their context sentences, and they are not suitable as a response to a message.

If it is determined at 406 that the sentence does not satisfy the third condition, at 410, the sentence is determined to be unsuitable for the conversation. If the sentence satisfies the third condition, the sentence is determined to be suitable for the conversation at 408. Thus, by determining whether the sentence is suitable for the conversation on various aspects, the sentence can be presented only when the sentence is suitable for the conversation, thereby further ensuring the suitability of the sentence for the conversation.

It is to be understood that although steps 402, 404 and 406 are shown in sequence in FIG. 4, this is merely for the purpose of illustration without suggesting any limitation as to the scope of the subject matter described herein. In alternative implementations, steps 402, 404 and 406 may be carried out in any other suitable sequences or in parallel.

FIGS. 5A-5D illustrate graphical user interfaces (GUIs) for chatting in a conversation in accordance with an example implementation of the subject matter described herein. It is to be understood that the GUIs in FIGS. 5A-5D may be displayed on a display unit in the device 110 in FIG. 1. These example GUIs are illustrated only for the purpose of illustration and help those skilled in the art to understand and implement the subject matter described herein, without suggesting any limitations as to the scope of the subject matter described herein.

As shown in FIGS. 5A-5D, a user of the device 110 is chatting with a chatbot powered by the chatbot engine 140 during a conversation. The user may input a message through an input box 510, and then the user may click on a button 520 in order to send the message to the chatbot after finishing the message. In some implementations, the input box 510 may include a text input field through which the user may use a keyboard or keypad to enter text characters. Alternatively, or in addition, the input box 510 may include a handwriting field through which the user may input characters by handwriting.

For example, the user may write the characters to be input using a pointing device such as a mouse. In yet another implementation, the input box 510 may include a voice input field through which the user may input the message by speech. In some implementations, the user is allowed to send image or video messages as well.

Figure 5A:
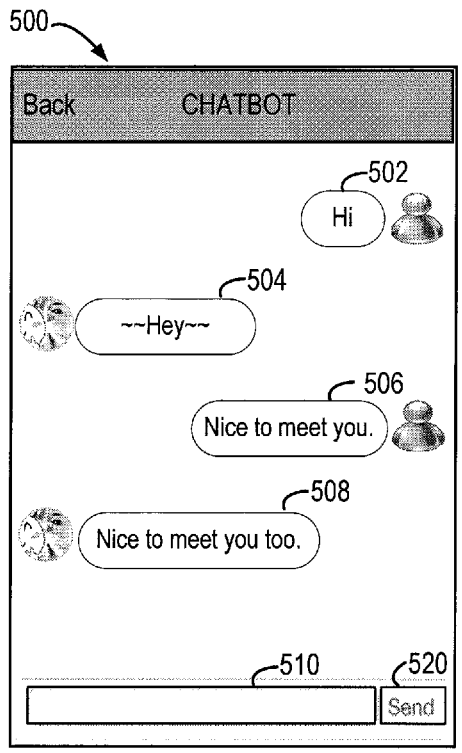
FIGS. 5A-5D illustrate graphical user interfaces (GUIs) for chatting in a conversation in accordance with an example implementation of the subject matter described herein.

In the GUI 500 as shown in FIG. 5A, the user sends a message 502 "hi" to the chatbot. Since the message 502 will be determined as a chitchat message, any sentence selected from document is unsuitable for the conversation. In this case, a chitchat response 504 "~~Hey~~" is generated and rendered as a response to the message 502 in the conversation. Likewise, for a chitchat message 506 "Nice to meet you," a chitchat response 508 "Nice to meet you too" may be presented as a response.

Figure 5B:
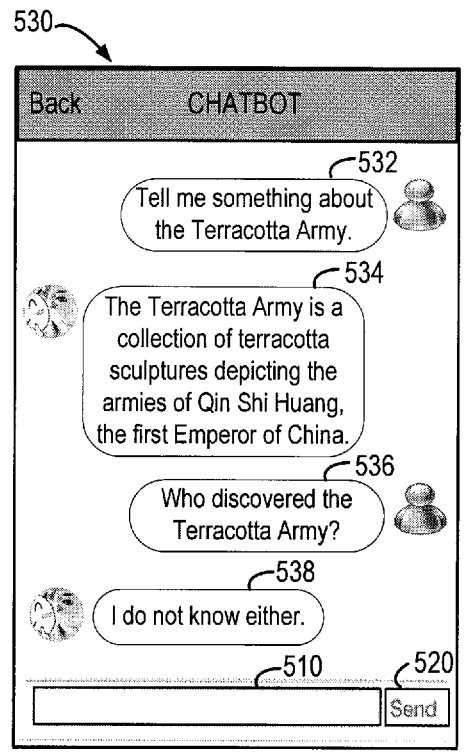

Referring to FIG. 5B, in the GUI 530, the user sends a message 532 "Tell me something about the Terracotta Army" to the chatbot. The chatbot engine 140 determines the message 532 as a non-chitchat message which inquires information about the Terracotta Army. In response, the chatbot engine 140 selects a sentence from a document(s) by performing sentence-wise matching between the message 532 and one or more documents. Then, the sentence is determined to be suitable for the conversation, and a document-based sentence response 534 "The Terracotta Army is a collection of terracotta sculptures depicting the armies of Qin Shi Huang, the first Emperor of China" is presented as a response to the message 532 in the conversation.

Next, it assumed that the user sends a message 536 "Who discovered the Terracotta Army." Since the relevance between the message 536 and the most relevant sentence (for example, the sentence "The chamber containing the Terra Cotta Army was discovered in 1974 by a group of farmers attempting to dig a well near the ancient capital city of Chang 'an in what is today the Shaanxi Province, near the modern city of Xi' an") does not satisfy the second condition, the most relevant sentence is determined to be unsuitable for the conversation and would not be presented as a response to the message 536. Instead, a chitchat response 538 "I do not know either" is generated based on Q-R pairs and is presented as a response to the message 536, as show in GUI 530.

Figure 5C:
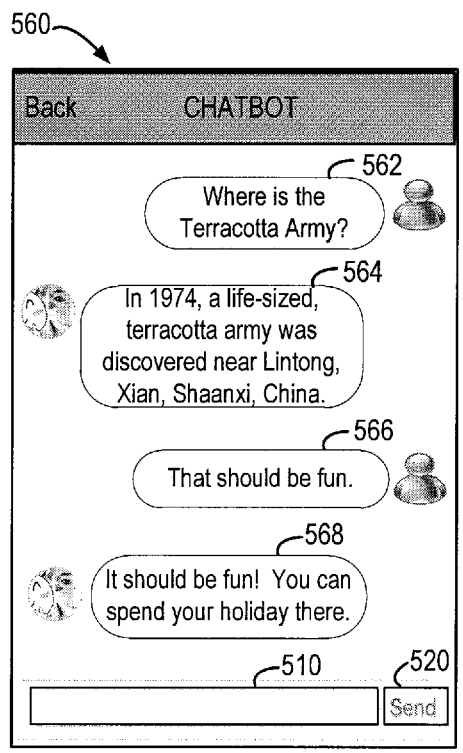

In the GUI 560 as shown in FIG. 5C, a document-based response 564 "In 1974, a life-sized, terracotta army was discovered near Lintong, Xian, Shaanxi, China" is presented as a response to a message 562 "Where is the Terracotta Army" in the conversation. Then, the user sends a message 566 "That should be fun", the chatbot engine 140 considers the context of the conversation and understands that the pronoun "that" in the message 566 refers to "the Terracotta Army" in the previous messages. However, it is determined that the most relevant sentence "Funny satire stories about Terracotta Army" is not suitable for the conversation. Thus, a chitchat response 568 "It should be fun, you can spend your holiday there" is generated based on Q-R pairs and is presented as a response to the message 566.

Figure 5D:
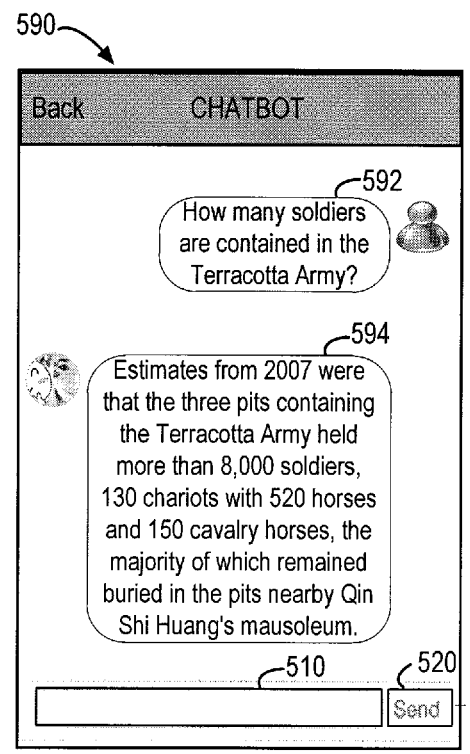

In the FIG. 5D, there is shown another conversation between the user and the chatbot, by use of the implementations of the subject matter described herein, a document-based response 594 "Estimates from 2007 were that the three pits containing the Terracotta Army held more than 8,000 soldiers, 130 chariots with 520 horses and 150 cavalry horses, the majority of which remained buried in the pits nearby Qin Shi Huang's mausoleum" is presented as a response to a message 592 "How many soldiers are contained in the Terracotta Army" in the conversation.

As seen from GUIs 500, 530, 560 and 590 in FIGS. 5A-5D, compared with the traditional chatbot systems, the response generated by the chatbot engine of the subject matter described herein is more meaningful and satisfying. Moreover, the response to the message is more suitable for the conversation by flexible use of the document-base response or chitchat response. Thus, the method and device according to implementations of the subject matter described herein may apply to existing chatbot systems in order to improve the quality of the response and enhance user experiences.

Figure 6:
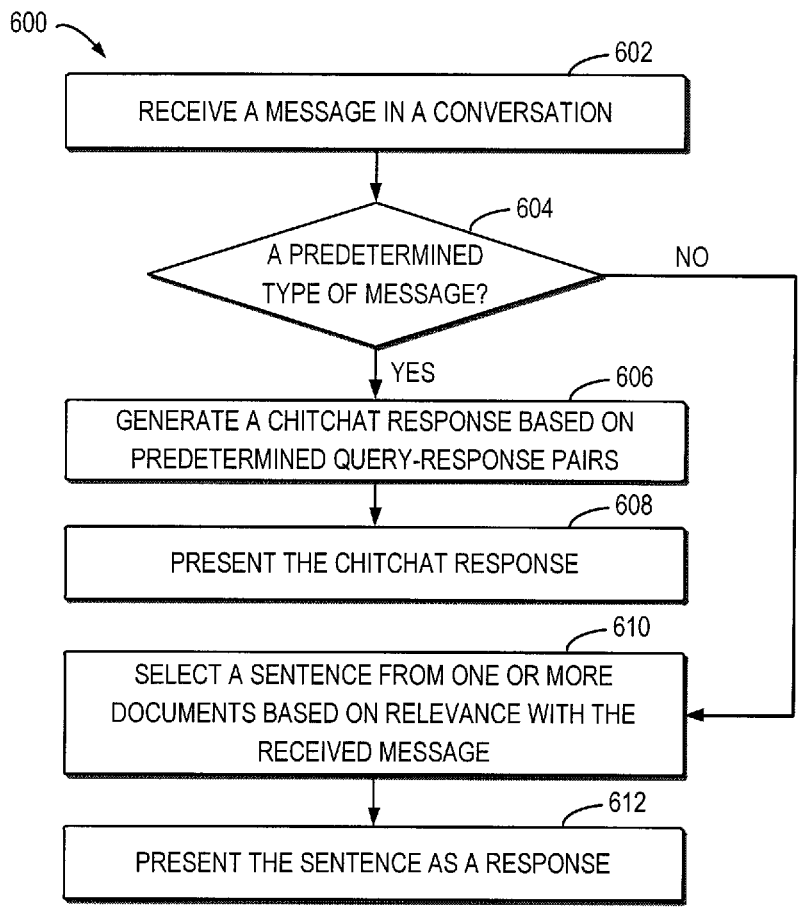
FIG. 6 is a flowchart illustrating a method for presenting a response to a message in a conversation in accordance with another example implementation of the subject matter described herein.

It is to be understood that implementations described above, such as the methods 300 and 400, are only example implementations. Various modifications and/or variations can be made within the scope of the subject matter described herein. As an example, in the method 600 as shown in FIG. 6, after receiving a message at 602, it is possible to directly determine the type of the received message at 604. That is, the chatbot engine 140 verifies whether the received message is a predetermined type of message. In some implementations, the predetermined type of message includes, but is not limited to, a chitchat message, a message that only includes stop word(s), a disordered message, or a meaningless message. If so, a chitchat response can be directly generated from the predetermined Q-R pairs at 606 and then displayed to the user at 608, without retrieving sentences from the documents.

Otherwise, if it is determined at 604 that the received message is a non-predetermined message, at 610, a sentence(s) may be selected from one or more documents by determining relevance between the message and sentences in the one or more documents. In this regard, all the features as described above apply and will not be repeated. At 612, the selected sentence is directly presented in the conversation as a response to the message. It would be appreciated that it is unnecessary to verify the suitability of the sentence in this event.

Figure 7:
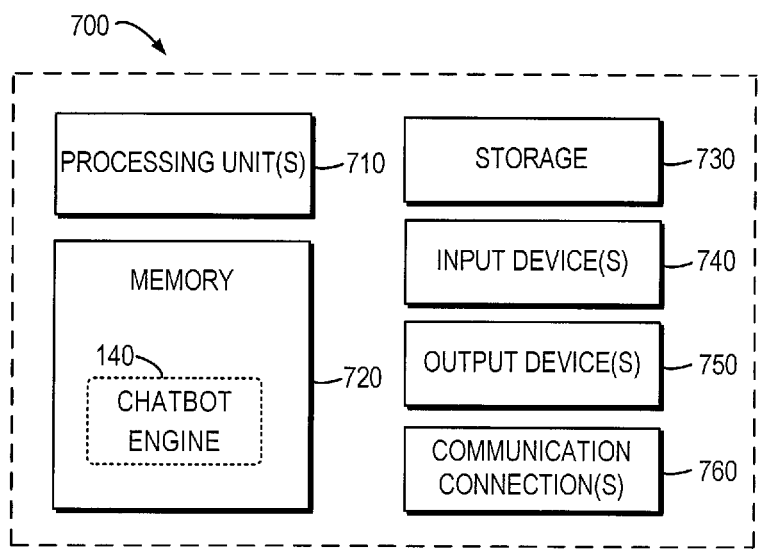
FIG. 7 is a block diagram of a device suitable for implementing one or more implementations of the subject matter described herein.

FIG. 7 is a block diagram of a device 700 suitable for implementing one or more implementations of the subject matter described herein. For example, the device 700 may function as the devices 110 or the server 130 as discussed above with reference to FIG. 1. It is to be understood that the device 700 is not intended to suggest any limitation as to scope of use or functionality of the subject matter described herein, as various implementations may be implemented in diverse general-purpose or special-purpose computing environments.

As shown, the device 700 includes at least one processing unit (or processor) 710 and a memory 720. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory), or some combination thereof.

In the example shown in FIG. 7, the device 700 further includes storage 730, one or more input devices 740, one or more output devices 750, and one or more communication connections 760. An interconnection mechanism (not shown) such as a bus, controller, or network interconnects the components of the device 700. Typically, operating system software (not shown) provides an operating environment for other software executing in the device 700, and coordinates activities of the components of the device 700.

The storage 730 may be removable or non-removable, and may include computer-readable storage media such as flash drives, magnetic disks or any other medium which can be used to store information and which can be accessed within the device 700. The input device(s) 740 may be one or more of various different input devices. For example, the input device(s) 740 may include a user device such as a mouse, keyboard, trackball, etc. The input device(s) 740 may implement one or more natural user interface techniques, such as speech recognition or touch and stylus recognition. As other examples, the input device(s) 740 may include a scanning device; a network adapter; or another device that provides input to the device 700. The output device(s) 750 may be a display, printer, speaker, network adapter, or another device that provides output from the device 700. The input device(s) 740 and output device(s) 750 may be incorporated in a single system or device, such as a touch screen or a virtual reality system.

The communication connection(s) 760 enables communication over a communication medium to another computing entity. Additionally, functionality of the components of the device 700 may be implemented in a single computing machine or in multiple computing machines that are able to communicate over communication connections. Thus, the device 700 may operate in a networked environment (for example, the environment 100) using logical connections to one or more other servers, network PCs, or another common network node. By way of example, and not limitation, communication media include wired or wireless networking techniques.

In accordance with implementations of the subject matter described herein, a chatbot engine 140 may be executed on the device 700 to allow a user of the device 700 or another device to chat with the chatbot hosted by the chatbot engine 140. Then executed by the processing unit 760, at least a portion of the chatbot engine 140 will be loaded into the memory 720. The other portion (if any) of the chatbot engine 140 may be stored in the storage 730 or any other non-volatile storage medium. In operation, the chatbot engine 140 may carry out one or more methods/processes as described above.

For the purpose of illustrating spirit and principle of the subject matter described herein, some specific implementations thereof have been described above. By using sentences from a document rather than Q-R pairs, the adaptability of the chatbot system on different chatting topics is significantly improved. Moreover, the responses coming from a document(s) make the responses meaningful and satisfying. Thus, a more suitable response can be presented in the conversation. As a result, the user experiences may be greatly enhanced in the chatbot scenario.

Now only for the purpose of illustration, some example implementations will be listed below.

In some implementations, the subject matter described herein may be embodied as a device. The device comprises a processing unit and a memory. The memory is coupled to the processing unit and stores instructions for execution by the processing unit. The instructions, when executed by the processing unit, cause the device to determine relevance between the message and a plurality of sentences in at least one document in response to receiving a message during a conversation; select a sentence from the plurality of sentences based on the relevance; determine suitability of the selected sentence for the conversation and present a response to the received message based on the determined suitability.

In some implementations, the determining relevance between the message and a plurality of sentences in at least one document comprises: obtaining a subset of sentences by filtering the plurality of sentences based on word-level matching the message and the plurality of sentence; and determining multi-level similarities between the message and the subset of sentences.

In some implementations, the determining multi-level similarities comprises determining at least two of the following similarities between the message and the subset of sentences: a word-level similarity, a phrase-level similarity, a sentence-level similarity, a document-level similarity, or a semantic-level similarity.

In some implementations, the determining multi-level similarities comprises determining the document-level similarity between the message and a first sentence by: determining a first sentence-level similarity between the message and the first sentence; determining a second sentence-level similarity between the message and a second sentence prior to the first sentence; determining a third sentence-level similarity between the message and a third sentence subsequent to the first sentence; and determining the document-level similarity between the message and the first sentence based on the first, second and third second sentence-level similarities.

In some implementations, the determining the relevance between the message and the plurality of sentences further comprises: determining a relationship between a first sentence and a second sentence in the at least one document, the first sentence being subsequent to the second sentence; and in response to determining that the first and second sentences are of a causality relationship, determining the relevance between the message and the first sentence based on a matching degree between the message and the second sentence.

In some implementations, the selecting a sentence from the plurality of sentences based on the relevance comprises: ranking the plurality of sentences based on the relevance; and selecting the sentence from the plurality of sentences based on the ranking.

In some implementations, wherein the presenting a response to the received message based on the determined suitability comprises: in response to determining that the selected sentence is suitable for the conversation, presenting the selected sentence as the response to the message in the conversation; and in response to determining that the selected sentence is unsuitable for the conversation, generating a chitchat response to the message based on predetermined query-response pairs; and presenting the chitchat response in the conversation.

In some implementations, the determining suitability of the selected sentence for the conversation comprises: determining that the selected sentence is unsuitable for the conversation in response to determining that the message is a chitchat message or all words included in the message are stop words.

In some implementations, the determining suitability of the selected sentence for the conversation comprises: determining that the selected sentence is unsuitable for the conversation in response to the relevance between the message and the selected sentence being below a threshold.

In some implementations, the determining suitability of the selected sentence for the conversation comprises: determining that the selected sentence is unsuitable for the conversation in response to a length of the selected sentence exceeding a predetermined threshold or the selected sentence starting with a predetermined word.

Alternatively, or in addition, the subject matter described herein may be embodied a computer-implemented method. The method comprises determining relevance between the message and a plurality of sentences in at least one document in response to receiving a message during a conversation. The method further comprises selecting a sentence from the plurality of sentences based on the relevance. The method also comprises determining suitability of the selected sentence for the conversation and presenting a response to the received message based on the determined suitability.

In some implementation, the subject matter described herein may be embodied as a device comprising a processing unit and a memory. The memory is coupled to the processing unit and stores instructions for execution by the processing unit. The instructions, when executed by the processing unit, cause the device to: in response to receiving a message during a conversation, determine a type of the message; in response to determining that the message is of a predetermined type, generate a chitchat response to the message based on predetermined query-response pairs; and present the chitchat response in the conversation; and in response to determining that the message is of a non-predetermined type, select a sentence from a plurality of sentences in a document based on relevance between the message and the plurality of sentences; and present the selected sentence in the conversation as a response to the message.

Implementations of the subject matter described herein may further include one or more computer program products being tangibly stored on a non-transient machine-readable medium and comprising machine-executable instructions. The instructions, when executed on a device, causing the device to carry out one or more processes as described above.

In general, the various example implementations may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example implementations of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

In the context of the subject matter described herein, a machine readable medium may be any tangible medium that can contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the subject matter described herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions or operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination.

Various modifications, adaptations to the foregoing example implementations of this disclosure may become apparent to those skilled in the relevant arts in view of the foregoing description, when read in conjunction with the accompanying drawings. Any and all modifications will still fall within the scope of the non-limiting and example implementations of this disclosure. Furthermore, other implementations of the disclosures set forth herein will come to mind to one skilled in the art to which these implementations of the disclosure pertain having the benefit of the teachings presented in the foregoing descriptions and the drawings.

Therefore, it will be appreciated that the implementations of the disclosure are not to be limited to the specific implementations disclosed and that modifications and other implementations are intended to be included within the scope of the appended claims. Although specific terms are used herein, they are used in a generic and descriptive sense only and not for purposes of limitation.

What is claimed is:
1. A device comprising:
 a processing unit; and
 a memory coupled to the processing unit and storing instructions for execution by the processing unit, the instructions, when executed by the processing unit, causing the device to:
  in response to receiving a message during a conversation, determine relevance between the message and a plurality of sentences in a document;
  select a sentence from the plurality of sentences based on the relevance;
  determine suitability of the selected sentence for the conversation, wherein the selected sentence is unsuitable for the conversation when it is determined that the message is a chitchat message or all words included in the message are stop words;
  in response to determining that the selected sentence is suitable for the conversation, presenting the selected sentence as the response to the message in the conversation; and
  in response to determining that the selected sentence is unsuitable for the conversation, presenting a chitchat response as the response to the message in the conversation.

2. The device of claim 1, wherein the determining relevance between the message and a plurality of sentences in a document comprises:
   obtaining a subset of sentences by filtering the plurality of sentences based on word-level matching between the message and the plurality of sentences; and
   determining multi-level similarities between the message and the subset of sentences.

3. The device of claim 2, wherein the determining multi-level similarities comprises:
   determining at least two of the following similarities between the message and the subset of sentences:
   a word-level similarity,
   a phrase-level similarity,
   a sentence-level similarity,
   a document-level similarity, or
   a semantic-level similarity.

4. The device of claim 3, wherein the determining multi-level similarities comprises determining the document-level similarity between the message and a first sentence by:
   determining a first sentence-level similarity between the message and the first sentence;
   determining a second sentence-level similarity between the message and a second sentence prior to the first sentence;
   determining a third sentence-level similarity between the message and a third sentence subsequent to the first sentence; and
   determining the document-level similarity between the message and the first sentence based on the first, second and third second sentence-level similarities.

5. The device of claim 1, wherein the determining the relevance between the message and the plurality of sentences further comprises:
   determining a relationship between a first sentence and a second sentence in the document, the first sentence being subsequent to the second sentence; and
   in response to determining that the first and second sentences are of a causality relationship, determining the relevance between the message and the first sentence based on a matching degree between the message and the second sentence.

6. The device of claim 1, wherein the selecting a sentence from the plurality of sentences based on the relevance comprises:
   ranking the plurality of sentences based on the relevance; and
   selecting the sentence from the plurality of sentences based on the ranking.

7. The device of claim 1, wherein the determining suitability of the selected sentence for the conversation comprises:
   in response to the relevance between the message and the selected sentence being below a threshold, determining that the selected sentence is unsuitable for the conversation.

8. The device of claim 1, wherein the determining suitability of the selected sentence for the conversation comprises:
   in response to a length of the selected sentence exceeding a predetermined threshold or the selected sentence starting with a predetermined word, determining that the selected sentence is unsuitable for the conversation.

9. A computer-implemented method comprising:
   in response to receiving a message during a conversation, determining relevance between the message and a plurality of sentences in a document;
   selecting a sentence from the plurality of sentences based on the relevance;
   determining suitability of the selected sentence for the conversation, wherein the selected sentence is unsuitable for the conversation when it is determined that the message is a chitchat message or all words included in the message are stop words;
   in response to determining that the selected sentence is suitable for the conversation, presenting the selected sentence as the response to the message in the conversation; and
   in response to determining that the selected sentence is unsuitable for the conversation, presenting a chitchat response as the response to the message in the conversation.

10. The method of claim 9, wherein the determining relevance between the message and a plurality of sentences in a document comprises:
    obtaining a subset of sentences by filtering the plurality of sentences based on word-level matching between the message and the plurality of sentences; and
    determining multi-level similarities between the message and the subset of sentences.

11. The method of claim 10, wherein the determining multi-level similarities comprises:
    determining at least two of the following similarities between the message and the subset of sentences:
    a word-level similarity,
    a phrase-level similarity,
    a sentence-level similarity,
    a document-level similarity, or
    a semantic-level similarity.

12. The method of claim 11, wherein the determining multi-level similarities comprises determining the document-level similarity between the message and a first sentence by:
    determining a first sentence-level similarity between the message and the first sentence;
    determining a second sentence-level similarity between the message and a second sentence prior to the first sentence;
    determining a third sentence-level similarity between the message and a third sentence subsequent to the first sentence; and
    determining the document-level similarity between the message and the first sentence based on the first, second and third second sentence-level similarities.

13. The method of claim 9, wherein the determining the relevance between the message and the plurality of sentences further comprises:
    determining a relationship between a first sentence and a second sentence in the document, the first sentence being subsequent to the second sentence; and
    in response to determining that the first and second sentences are of a causality relationship, determining the relevance between the message and the first sentence based on a matching degree between the message and the second sentence.

14. The method of claim 9, wherein the selecting a sentence from the plurality of sentences based on the relevance comprises:
    ranking the plurality of sentences based on the relevance; and
    selecting the sentence from the plurality of sentences based on the ranking.

15. The method of claim 9, wherein the determining suitability of the selected sentence for the conversation comprises:
in response to the relevance between the message and the selected sentence being below a threshold, determining that the selected sentence is unsuitable for the conversation.

16. The method of claim 9, wherein the determining suitability of the selected sentence for the conversation comprises:
in response to a length of the selected sentence exceeding a predetermined threshold or the selected sentence starting with a predetermined word, determining that the selected sentence is unsuitable for the conversation.

17. A system comprising:
a processor; and
memory coupled to the processor, the memory comprising computer executable instructions that, when executed by the processor, performs a method comprising:
in response to receiving a message during a conversation, determining relevance between the message and a plurality of sentences in a document;
select a sentence from the plurality of sentences based on the relevance;
determine suitability of the selected sentence for the conversation, wherein the selected sentence is unsuitable for the conversation when it is determined that the message is a chitchat message or all words included in the message are stop words;
in response to determining that the selected sentence is suitable for the conversation, presenting the selected sentence as the response to the message in the conversation; and
in response to determining that the selected sentence is unsuitable for the conversation, presenting a chitchat response as the response to the message in the conversation.

18. The system of claim 17, wherein the message is received via a chatting application of the system.

19. The system of claim 17, wherein the chitchat response is determined by matching the message to one or more predetermined query-response pairs.

20. The system of claim 17, wherein the determining relevance between the message and a plurality of sentences in a document comprises:
obtaining a subset of sentences by filtering the plurality of sentences based on phrase-level matching or sentence-level matching between the message and the plurality of sentences.

* * * * *